Sept. 8, 1953 W. T. ROSSELL 2,651,386
HYDRAULIC RATCHET OR BRAKE
Filed Jan. 10, 1950 2 Sheets-Sheet 1
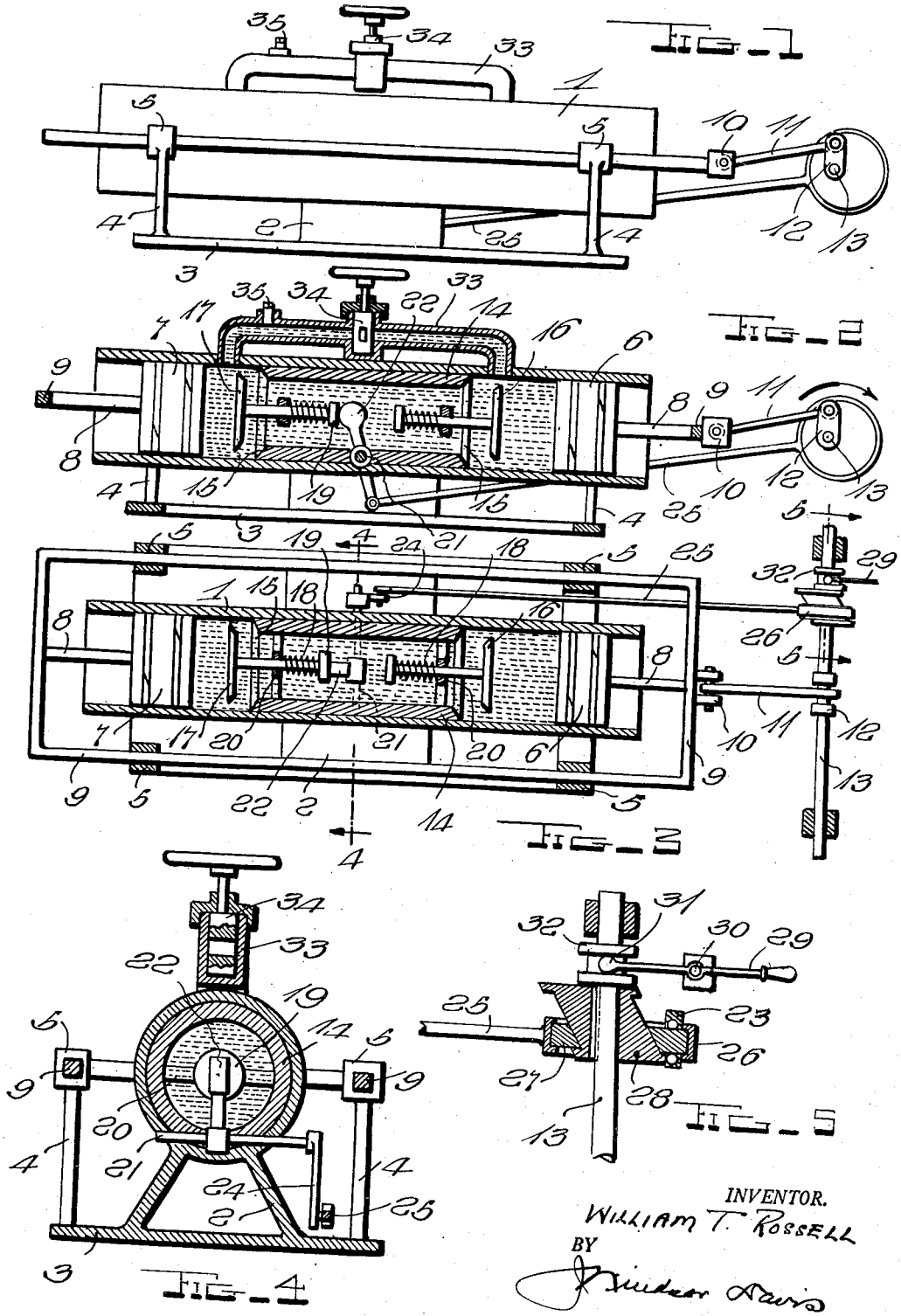
INVENTOR.
WILLIAM T. ROSSELL
BY
ATTORNEY Sept. 8, 1953 W. T. ROSSELL 2,651,386
HYDRAULIC RATCHET OR BRAKE
Filed Jan. 10, 1950 2 Sheets-Sheet 2
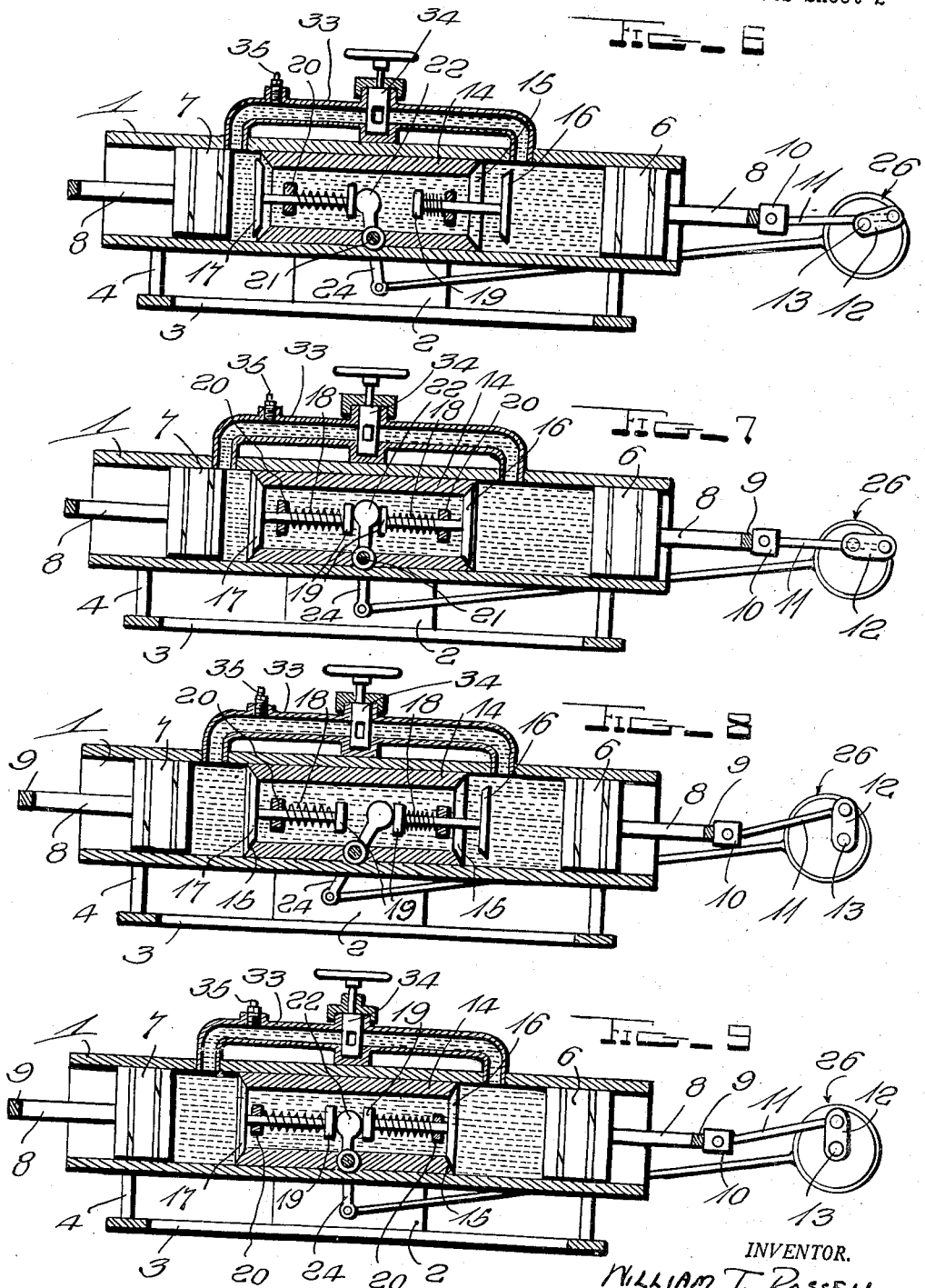
INVENTOR.
WILLIAM T. ROSSELL
BY
ATTORNEY Patented Sept. 8, 1953

2,651,386

UNITED STATES PATENT OFFICE 2,651,386

HYDRAULIC RATCHET OR BRAKE

William T. Rossell, New York, N. Y.

Application January 10, 1950, Serial No. 137,875

11 Claims. (Cl. 188—98)

This invention relates to hydraulic fluid devices and has for its object to provide a control means for a primary shaft by which rotation of the primary shaft may be limited to one direction. The device may thus be called a hydraulic ratchet.

Another object of the device is to provide a hydraulic ratchet, as above described, together with a selector by which the direction of rotation of the primary shaft may be designated automatically or selected by an operator.

The conventional ratchets, such as the ratchet wheel and pawl, and the ball clutch devices have served successfully for many years in a great variety of applications. The weakness of all such devices is in the fact that full pressures must be transmitted through very limited areas. The pawl, for instance, transmits all pressure through a single tooth. An object of this invention is to provide a ratchet which will withstand very severe pressures, which will operate for long periods without perceptible wear, which is economical to construct and which can be readily maintained when necessary.

Another object of the invention is to provide a hydraulic ratchet with a selector by which either or both directions of rotation may be selected, the selector being also capable of selecting either direction of rotation thus locking the device against movement. A manually operable by-pass line is then provided and equipped with a valve to allow a limited flow of fluid therepast in either direction thus converting the device into a cushioned brake for the shaft.

Other objects and advantages will become hereinafter more fully apparent as reference is had to the accompanying drawings wherein my invention is illustrated by way of example and in which Figure 1 is a side elevation of the device operatively connected to a primary shaft, Figure 2 is a vertical diametric section taken longitudinally of Figure 1, Figure 3 is a horizontal diametric section taken longitudinally of Figure 1, Figure 4 is a vertical section taken along the line 4—4 of Figure 3, Figure 5 is a detail section taken along the line 5—5 of Figure 3, and Figures 6, 7, 8 and 9 are views similar to Figure 2 with the valves and pistons shown in various positions for purposes of explanation.

More particularly, I indicates the cylinder of my improved ratchet which is supported by the leg 2 from a base 3. The base 3 has uprights 4 arising therefrom, each upright being equipped with bearings 5 at its upper ends.

Two pistons 6 and 7, each having a piston rod 8, are mounted in the cylinder 1. The piston rods 8 are rigidly secured to a rack 9 slidably mounted in the bearings 5 so that the pistons 6 and 7 must move in unison. The rack 9 is pivotally attached at 10 to a crank rod 11 journalled on the crank 12 of a shaft 13. The shaft 13 may be any shaft, the rotation or direction of rotation of which, it is desired to control.

Interiorly of the cylinder 1 is a sleeve 14 having valve seats 15 formed on the ends thereof. Each of two valves 16 and 17 are adapted to seat on the seats 15 under the influence of the springs 18 which press against one of the enlarged heads 19 of the stems of said valves 16 and 17 and against the two spiders 20 fitted interiorly of the sleeve 14. A valve actuator 21 extends through the cylinder 1 midway between the valve seats 15 carrying a cam head 22 thereon. The outer end 24 of the actuator is attached to one end of a link 25. This link has an eccentric strap 26 at its other end which engages a two part eccentric.

The eccentric is composed of an eccentric ring 27 on the periphery of which the strap 26 rides. It is keyed on a second eccentric 28 which, in turn, is keyed to the shaft 13. The part 28 is shaped, as best shown in Figure 5, so that as it is slid along the shaft the eccentricity of the ring 27 is moved directly across the center of the shaft 13. In other words, the eccentricity of the eccentric may be shifted 180°. A hand lever 29 mounted intermediate its ends on a fixed pivot 30 has a yoke 31 which engages a grooved collar 32 secured to the eccentric part 28 by which the part 28 may be shifted to reverse the position of the cam lobes. A thrust bearing 23 holds the cam ring 27 against shifting.

The operation is as follows: assume that the space between the pistons has been filled with a light oil or with some other suitable liquid and that the shaft 13 is rotating in a clockwise direction as indicated by the arrow in Figure 2. With the pistons at their intermediate position of travel toward the right the piston 7 is delivering liquid into the space being vacated by the piston 6. The valve 17 is being held in its maximum open position by the valve actuator 21 and the valve 16 is held open by the pressure of liquid flowing therepast.

As the pistons approach the end of their stroke, as illustrated in Figure 6, the valve 17 begins to close but the valve 16 is held off its seat so long as liquid is being delivered therepast by the piston 7. When the stroke to the right has been completed and the piston 7 is no longer delivering liquid the valve actuator 21 passes through its neutral position at its maximum speed so that as soon as it passes its neutral position as shown in Figure 7 it begins to open the valve 16, the piston 6 then begins its delivery of liquid to the space being vacated by the piston 7. The valve 17 is opened by the pressure of the delivered liquid.

Now suppose that at any time, as for instance with the parts as shown in Figure 2, the rotation of the shaft 13 ceases. The valve 16 will close under the influence of its spring 19. If rotation of the shaft 13 is thereafter resumed in the same direction the piston 17 will resume delivery of liquid thus re-opening the valve 16. However, if attempt is made to rotate the shaft 13 in reverse direction the valve 16 will remain closed and the piston 6 cannot deliver liquid therepast. The shaft 13 may continue a rotation, it may stop and resume rotation in the same direction but it is prohibited from reversing its rotation.

Now, suppose that the parts are in the position illustrated in Figure 2 and that the shaft 13 is rotating in clockwise direction, and suppose further that rotation of the shaft 13 ceases thus permitting closing of the valve 16 by its spring 19. As explained, the rotation of the shaft cannot be reversed. However, if the manual lever 29 is moved to its other extreme position the eccentric 28 will be shifted with respect to the eccentric ring 27 thus shifting the eccentricity of the ring 27 through 180°. The effect is shown in Figure 8 as compared with Figure 2. The pistons will not be affected but the actuator 21 will be shifted to a position such that it will open the valve 16 and permit closing of the valve 17. Now, if the shaft 13 is rotated in reverse direction the piston 16 may deliver liquid past the open valve 16 and open the valve 17. The shaft 13 may continue to rotate in reverse direction but cannot rotate in its original direction unless the eccentric members 27 and 28 are restored to their original position.

As the eccentric 28 is being moved with respect to the eccentric ring 27 the ring will pass through a position of zero eccentricity. If we stop the eccentric in this position, as illustrated in Figure 9, the actuator 21 will be centered thus allowing both valves 16 and 17 to close under the influence of their springs and the shaft 13 will thus be precluded from rotating in either direction. At any time during operation or when the shaft 13 is idle the device will become a brake against rotation of the shaft 13 merely by moving the handle 29 to its middle or neutral position. I also provide means for freely by-passing the valves 16 and 17, herein illustrated as being in the form of a by-pass line 33 connecting the space between the valves 16 and 17 and the pistons 6 and 7, respectively. When this line 33 is open the pistons may move back and forth freely and hence the shaft 13 may rotate freely in either direction. I further provide a manually operable valve 34 in the line 33. By slowly rotating this valve from open toward closed position a soft or a partial braking action can be imparted to the shaft 13.

A filler plug 35 is provided at some point and may be suitably located in the by-pass line 33.

The invention is susceptible of wide variations of design to accommodate it to numerous uses as will occur to those skilled in the art. I therefore desire to be extended protection as defined by the scope of the appended claims.

What I claim is:

1. A hydraulic ratchet for a rotary shaft comprising a fluid receptacle having two chambers, means actuated by said shaft for displacing said fluid from a first one of said chambers to the other, and valve means controlling such displacement comprising a non-return valve adapted to open under the influence of fluid being expelled from the first one of said chambers and to close automatically when the pressure thereagainst ceases together with timed means including a rocker arm having a pitman pivotally connected to one end thereof, said pitman being actuated by said shaft for holding said valve unseated for the return of liquid to said first chamber, said timed means operating to open said valve only after complete expulsion of fluid from said first chamber and during replenishment of fluid in said first chamber.

2. A hydraulic ratchet for a rotary shaft comprising a fluid receptacle having two chambers, passage means connecting said chambers, fluid displacing means operated by said shaft for displacing and delivering the fluid alternately from each of said chambers to the other thereof, a non-return valve for each of said chambers located in said passage means, each of said valves facing in the direction to unseat in response to fluid pressure during delivery from the opposite chamber and control means operated by said shaft adapted to open and to hold open said passage means from one chamber to the valve of the other chamber throughout the complete delivery stroke by said fluid displacing means in said one chamber, the valve of the chamber receiving fluid being adapted to close upon cessation of delivery motion by the piston means thereof and to remain closed in case of attempt to reverse the direction of said fluid displacing means by reversal of the direction of said shaft.

3. A hydraulic ratchet for a rotary shaft comprising a fluid receptacle having two chambers connected by at least one passageway, spaced pistons operated by said shaft for displacing and delivering the fluid alternately from each of said chambers to the other thereof, a non-return valve for each of said chambers located in said passageway, the valve for each chamber facing in the direction to unseat in response to fluid pressure during delivery from the opposite chamber, control means operated by said shaft adapted to open and to hold open said passageway from one chamber to the valve of the other chamber throughout each complete delivery stroke by the piston in said one chamber, the valve of the chamber receiving fluid being adapted to close automatically upon cessation of delivery by the piston of the other chamber and to remain closed against an attempt to reverse the direction of said piston by reversal of the direction of rotation of said shaft, and manual means for reversing the position of said control means whereby the valve subject to automatic closing is held open and the valve being held open becomes responsive to fluid pressure.

4. A hydraulic ratchet for a rotary shaft comprising a receptacle having two fluid chambers, spaced pistons operated by said shaft for displacing and delivering said fluid from each of said chambers into the other thereof, each of said chambers having a non-return valve spring pressed toward its seat in the direction to block the delivery of fluid from its chamber, the valve for each of said chambers being adapted to be opened by the pressure of fluid being delivered from the other chamber, and means operated by said shaft to open and to hold open the valve of the chamber delivering fluid throughout its complete delivery stroke, the valve of the chamber receiving fluid closing automatically in case of cessation of motion of the piston in the other chamber and remaining closed under a further reduction in pressure in its chamber occasioned by an attempted reversal of direction of its piston by an attempted reversal of said shaft prior to completion of said delivery stroke.

5. A hydraulic ratchet for a rotary shaft comprising a fluid receptacle having two chambers connected by at least one passageway, spaced pistons operated by said shaft for displacing and delivering the fluid alternately from each of said chambers to the other thereof, a non-return valve for each of said chambers located in said passageway, the valve for each chamber facing in the direction to unseat in response to fluid pressure during delivery from the opposite chamber, control means operated by said shaft adapted to open and to hold open said passageway from one chamber to the valve of the other chamber throughout each complete delivery stroke by the piston in said one chamber, the valve of the chamber receiving fluid being adapted to close automatically upon cessation of delivery by the piston of the other chamber and to remain closed against an attempt to reverse the direction of said pistons by reversal of the direction of rotation of said shaft, and manual means for reversing the position of said control means whereby the valve subject to automatic closing is held open and the valve being held open becomes responsive to fluid pressure, and manual means for reversing the position of said control means thereby holding open the passageway from said other chamber to the valve of the first named chamber whereby the direction of motion of said pistons and of said shaft may be reversed.

6. A hydraulic ratchet for a rotary shaft comprising a fluid receptacle having two chambers connected by at least one passageway, spaced pistons operated by said shaft for displacing and delivering the fluid alternately from each of said chambers to the other thereof, a non-return valve for each of said chambers located in said passageway, the valve for each chamber facing in the direction to unseat in response to fluid pressure during delivery from the opposite chamber, control means operated by said shaft adapted to open and to hold open said passageway from one chamber to the valve of the other chamber throughout each complete delivery stroke by the piston in said one chamber, the valve of the chamber receiving fluid being adapted to close automatically upon cessation of delivery by the piston of the other chamber and to remain closed against an attempt to reverse the direction of said pistons by reversal of the direction of rotation of said shaft, and manual means for reversing the position of said control means whereby the valve subject to automatic closing is held open and the valve being held open becomes responsive to fluid pressure, and manual means for reversing the said control means to a position to hold open the valve of said other chamber while allowing the valve of said one chamber to be subject to opening by the pressure of fluid delivered to said one chamber whereby the pistons and said shaft may be reversed in direction of movement.

7. A hydraulic ratchet for a rotary shaft comprising a fluid receptacle having two chambers, means actuated by said shaft for causing alternate displacement of the fluid from each of said chambers to the other thereof, oppositely facing valves between said chambers each spring pressed toward its seat, one of said valves being opened by fluid pressure when fluid is being expelled from one of said chambers into the other, and means holding the other of said valves open during the period from the beginning to the completion of the expulsion of fluid from said one chamber, the first named valve automatically closing upon cessation of pressure thereagainst in its direction of opening and blocking a reverse flow by an attempted reversal of said shaft before completion of the expulsion of fluid from said one chamber.

8. A hydraulic ratchet for a rotary shaft comprising two cylinders each having a piston therein, said pistons being connected to said shaft and movable by said shaft to displace the fluid alternately from each of said cylinders into the other, a non-return valve for each of said cylinders spring-pressed towards its seat in a direction to block the delivery of fluid from its cylinder and each valve being adapted to open in response to the pressure of the fluid being delivered by the piston of the other cylinder, valve actuating means movable by said shaft to a position to unseat the valve of the cylinder delivering fluid throughout its complete delivery stroke and movable by said shaft to unseat the other of said valves during the subsequent complete delivery stroke by the piston of the other cylinder, the valve of the cylinder receiving the delivery of fluid closing automatically upon cessation of pressure thereagainst and remaining closed against an attempt to reverse the direction of its piston prior to completion of the delivery of fluid therepast, and manual control means operable to shift said valve actuator to a non-operating position whereby said valves remain closed and whereby said piston means and said shaft are prohibited from movement.

9. A hydraulic ratchet for a rotary shaft comprising two cylinders each having a piston therein, said pistons being connected to said shaft and movable by said shaft to displace the fluid alternately from each of said cylinders into the other, a non-return valve for each of said cylinders spring-pressed towards its seat in a direction to block the delivery of fluid from its cylinder and each valve being adapted to open in response to the pressure of the fluid being delivered by the piston of the other cylinder, valve actuating means movable by said shaft to a position to unseat the valve of the cylinder delivering fluid throughout its complete delivery stroke and movable by said shaft to unseat the other of said valves during the subsequent complete delivery stroke by the piston of the other cylinder, the valve of the cylinder receiving the delivery of fluid closing automatically upon cessation of pressure thereagainst and remaining closed against an attempt to reverse the direction of its piston prior to completion of the delivery of fluid therepast, and manual control means shiftable to vary the operation of said valve actuator means, said manual means when shifted to opposite position holding open the valve of said other cylinder and allowing the valve of said one chamber to operate under the influence of its own spring, said manual means when shifted to its mid position holding open neither of said valves thereby prohibiting displacement of fluid from one of said cylinders to the other and locking said shaft against rotation.

10. A hydraulic ratchet for a rotary shaft comprising two cylinders each having a piston therein, said pistons being connected to said shaft and movable by said shaft to displace the fluid alternately from each of said cylinders into the other, a non-return valve for each of said cylinders spring-pressed towards its seat in a direction to block the delivery of fluid from its cylinder and each valve being adapted to open in response to the pressure of the fluid being delivered by the piston of the other cylinder, valve actuating means movable by said shaft to a position to unseat the valve of the cylinder delivering fluid throughout its complete delivery stroke and movable by said shaft to unseat the other of said valves during the subsequent complete delivery stroke by the piston of the other cylinder, the valve of the cylinder receiving the delivery of fluid closing automatically upon cessation of pressure thereagainst and remaining closed against an attempt to reverse the direction of its piston prior to completion of the delivery of fluid therepast, manual control means operable to shift said valve actuating means to idle whereby neither of said valves will open, and manual means operable in selected degrees to open a by-pass between said cylinders whereby the braking action against said shaft may be cushioned.

11. A hydraulic ratchet for a rotary shaft comprising two cylinders each having a piston therein, said pistons being connected to said shaft and movable by said shaft to displace the fluid alternately from each of said cylinders into the other, a non-return valve for each of said cylinders spring-pressed towards its seat in a direction to block the delivery of fluid from its cylinder and each valve being adapted to open in response to the pressure of the fluid being delivered by the piston of the other cylinder, valve actuating means movable by said shaft to a position to unseat the valve of the cylinder delivering fluid throughout its complete delivery stroke and movable by said shaft to unseat the other of said valves during the subsequent complete delivery stroke by the piston of the other cylinder, the valve of the cylinder receiving the delivery of fluid closing automatically upon cessation of pressure thereagainst and remaining closed against an attempt to reverse the direction of its piston prior to completion of the delivery of fluid therepast, manual control means shiftable to vary the operation of said valve actuator means, said manual means when shifted to an opposite position holding open the valve of said other cylinder and allowing the valve of said one cylinder to function under the influence of its spring, said manual means when shifted to an intermediate position acting to open neither of said valves thereby braking said shaft against rotation, and manual means operable in selected amounts to by-pass fluid freely between said cylinders whereby the degree of braking against said shaft may be selected.

WILLIAM T. ROSSELL.

References Cited in the file of this patent

UNITED STATES PATENTS

| Number | Name | Date |
|---|---|---|
| 100,449 | Roberts | Mar. 1, 1870 |
| 1,831,437 | Brantly | Nov. 10, 1931 |